United States Patent
Want et al.

(10) Patent No.: US 9,002,930 B1
(45) Date of Patent: Apr. 7, 2015

(54) ACTIVITY DISTRIBUTION BETWEEN MULTIPLE DEVICES

(75) Inventors: Roy Want, Mountain View, CA (US); William Noah Schilit, Mountain View, CA (US)

(73) Assignee: Google Inc., Mountain View, CA (US)

( * ) Notice: Subject to any disclaimer, the term of this patent is extended or adjusted under 35 U.S.C. 154(b) by 402 days.

(21) Appl. No.: 13/452,297

(22) Filed: Apr. 20, 2012

(51) Int. Cl.
*G06F 15/16* (2006.01)
*H04L 29/04* (2006.01)

(52) U.S. Cl.
CPC .................................... *H04L 29/04* (2013.01)

(58) Field of Classification Search
USPC ......................................................... 709/203
See application file for complete search history.

(56) References Cited

U.S. PATENT DOCUMENTS

| | | | |
|---|---|---|---|
| 6,338,094 B1 | 1/2002 | Scott et al. | |
| 7,653,191 B1 * | 1/2010 | Glasser et al. | 379/201.1 |
| 2003/0054765 A1 | 3/2003 | Botteck | |
| 2003/0161327 A1 | 8/2003 | Vlodavsky et al. | |
| 2005/0166209 A1 | 7/2005 | Merrick et al. | |
| 2009/0119666 A1 | 5/2009 | McKean et al. | |
| 2011/0060998 A1 * | 3/2011 | Schwartz et al. | 715/738 |
| 2012/0042327 A1 * | 2/2012 | Gokhale et al. | 719/330 |
| 2012/0060100 A1 * | 3/2012 | Sherwood et al. | 715/748 |
| 2012/0117193 A1 * | 5/2012 | Phillips et al. | 709/219 |
| 2012/0272149 A1 * | 10/2012 | Lee et al. | 715/716 |

OTHER PUBLICATIONS

Jack Busch, "Stream Music Over Your Home Network with Windows Media Player 12", Feb. 23, 2010, p. 1-9.*
Wikipedia—the free encyclopedia, "Remote procedure call," pp. 1-4, accessed from en.wikipedia.org/wiki/Remote_procedure_call on Apr. 13, 2012.

* cited by examiner

*Primary Examiner* — Ryan Jakovac
(74) *Attorney, Agent, or Firm* — McDonnell Boehnen Hulbert & Berghoff LLP

(57) ABSTRACT

A first application, operating on a first client device, may perform a task. As part of performing the task, the first application may generate a message that includes a command, data, and a list of client devices suitable for invoking the command. The first client device may determine whether the first client device is in the list. If the first client device is in the list, the first client device may transmit the message to a local application on the first client device, to further perform the task by invoking the command on the data. If the first client device is not in the list, the first client device may select a second client device from the list, and transmit, via a server device, the message to the second client device.

19 Claims, 13 Drawing Sheets

ACTIVITY DISTRIBUTION BETWEEN MULTIPLE DEVICES

BACKGROUND

User interaction with client devices can be modeled as a series of activities, that when combined, allow a user to perform a task. Often, these tasks include the use of multiple applications on the client device. For instance, a task that involves streaming an online video may include the activities of using the client device's web browser to find a link to the online video, accessing the link to launch the client device's video player, and playing out the online video via the video player.

BRIEF SUMMARY

In an example embodiment, a first application, operating on a first client device, may perform a task. As part of performing the task, the first application may generate a message that includes a command, data, and a list of client devices suitable for invoking the command. The first client device may determine whether the first client device is in the list. If the first client device is in the list, the first client device may (i) transmit the message to a local application on the first client device, and (ii) the local application may further perform the task by invoking the command on the data. If the first client device is not in the list, the first client device may (i) select a second client device from the list, and (ii) transmit, via a server device, the message to the second client device. The message as transmitted via the server device may be configured to cause invocation of the command on the data by a remote application to further perform the task.

The first client device may make use of an article of manufacture, including a non-transitory computer-readable medium, having stored thereon program instructions that, upon execution by a first client device, cause the first client device to perform operations to perform steps of one or more embodiments.

Alternatively or additionally, the first client device may comprise a processor, a communication interface, and data storage containing program instructions. These program instructions, upon execution by the processor, may cause the first client device to perform operations to perform steps of one or more embodiments.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

1. Overview

Figure 1:
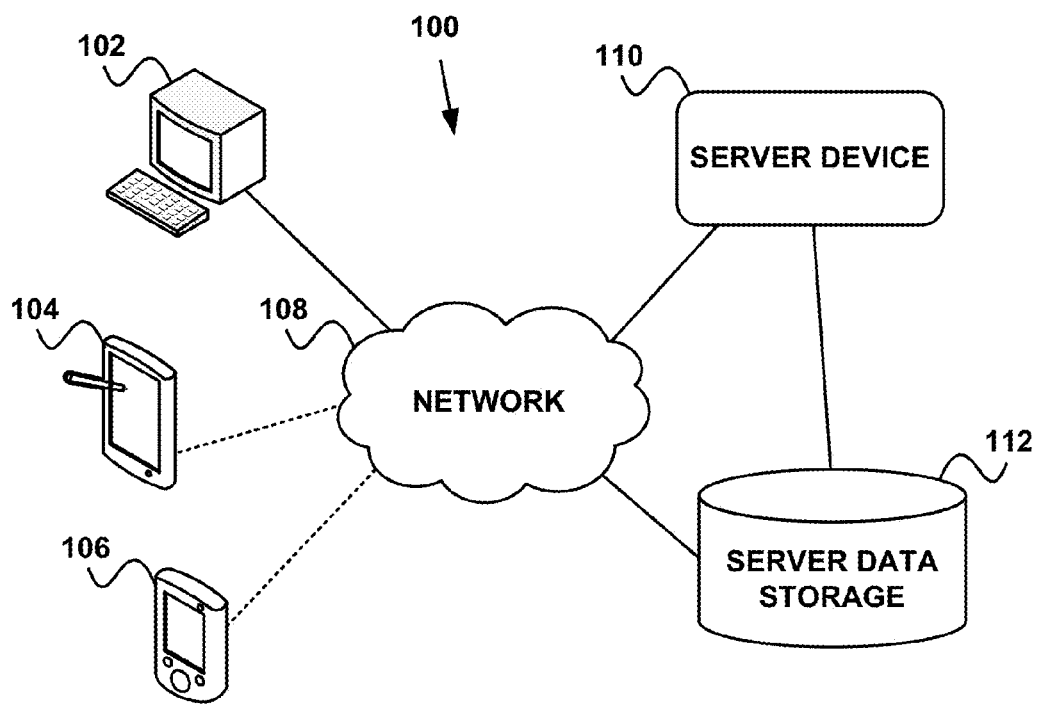
FIG. 1 depicts a distributed computing architecture, in accordance with an example embodiment.

A user's interaction with a client device, such as a smartphone or tablet computer, can be modeled as a series of activities, that when combined, allow the user to carry out a task. Each activity may be represented by a particular screen, application, or application state on the client device. As the user goes from activity to activity, the underlying applications may communicate with one another by transmitting intents.

For example, suppose that a user is viewing, in a web browser application, a web page that contains a link to a video. This web page and/or the act of viewing the web page may represent an activity. When the user selects the link, the client device's media player may be launched to play the video. The video playback and/or the act of viewing the video playback may represent another activity, and the combination of displaying the web page, receiving the user's selection of the link, and launching the media player to play the video represents a task.

When the user selects the link, the web browser may transmit an intent to the media player. The intent may include a command (e.g., play) and data (e.g., a uniform resource location (URL) of where the video can be found). Upon receiving the intent, the media player may invoke the command on the data.

Currently, tasks are carried out on a single device. However, there are a number of scenarios in which it may be useful to carry out tasks across multiple devices. For the example above, if the user is viewing the web page on a smartphone, he or she may wish to view the video playout on a device with a larger screen, such as a tablet computer, personal computer, or television. In this scenario, the web browser might transmit the intent to a media player on the tablet computer, personal computer, or television rather than to a media player on the smartphone. As another example, a user could be browsing the web on a personal computer, come across a phone number to call, and transmit an intent to call that number to a cell phone. The cell phone could then place the call.

In these ways, a task can be distributed across multiple devices by performing some activities on some devices and other activities on other devices. The device that performs a given activity may be the device that is best suited to carry out (e.g., to perform) that activity.

Other types of scenarios could also benefit from this distribution of activities. For example, a user might want to use one device to perform a first activity, temporarily switch to another device to perform a second activity, and then switch back to the initial device to either continue performing the first activity, or to perform a third activity. The result of the second activity may be transmitted to the initial device.

For instance, suppose that a user is drafting an email on his or her tablet computer. The user would like to attach a picture of the user's new puppy to the email, but does not have such a picture available on the tablet computer. So, perhaps at the user's direction, the tablet computer may transmit, to a camera device, an intent to take a picture. The camera device may receive the intent, and the user may take a picture of the puppy. The camera may then transmit the result of this picture-taking activity back to the tablet computer. The user can attach the picture to the email and continue drafting the email.

Clearly, there are many possible scenarios that can be facilitated by the general concepts introduced by these embodiments. Thus, these examples are not intended to be limiting. For instance, the embodiments herein can facilitate the sharing of activities between two or more users (e.g., one user can transmit an intent to play a video to a group of his or her friends). In some cases, this sharing may be between users who are already associated with one another, such as through a social networking or instant messaging service.

Regardless of the type of scenario, the communication between devices may be mediated by one or more server devices. For example, the devices that perform the task may be associated with one another, and a record of this association may be stored on the server device. For instance, both devices may register as being associated with one another via a web page on the server device, or one device might enter a serial number of the other device, or take a picture of a bar code or QR code of the other device, to indicate the association. Associated devices may transmit intents and/or results to one another through the server device.

2. Communication System and Device Architecture

The methods, devices, and systems described herein can be implemented using various types of client devices and possibly "cloud-based" server devices. Under aspects of this paradigm, client devices, such as mobile phones and tablet computers, may offload some processing and storage responsibilities to remote server devices. At least some of the time, these client services are able to communicate, via a network such as the Internet, with the server devices. As a result, applications that operate on the client devices may also have a persistent, server-based component.

The "server devices" described herein may not necessarily be associated with a client/server architecture, and therefore may be interchangeably referred to as "computing devices." Similarly, the "client devices" described herein also may not necessarily be associated with a client/server architecture, and therefore may be interchangeably referred to as "user devices."

This section describes general system and device architectures for such client devices and server devices. However, the methods, devices, and systems presented in the subsequent sections may operate under different paradigms as well. Thus, the embodiments of this section are merely examples of how these methods, devices, and systems can be enabled.

A. Communication System

FIG. 1 is a simplified block diagram of a communication system 100, in which various embodiments described herein can be employed. Communication system 100 includes client devices 102, 104, and 106, which represent a desktop personal computer (PC), a tablet computer, and a mobile phone, respectively. Each of these client devices may be able to communicate with other devices via a network 108 through the use of wireline connections (designated by solid lines) and/or wireless connections (designated by dashed lines).

Network 108 may be, for example, the Internet, or some other form of public or private Internet Protocol (IP) network. Thus, client devices 102, 104, and 106 may communicate using packet-switching technologies. Nonetheless, network 108 may also incorporate at least some circuit-switching technologies, and client devices 102, 104, and 106 may communicate via circuit switching alternatively or in addition to packet switching.

A server device 110 may also communicate via network 108. Particularly, server device 110 may communicate with client devices 102, 104, and 106 according to one or more network protocols and/or application-level protocols to facilitate the use of network-based or cloud-based computing on these client devices. Server device 110 may include integrated data storage (e.g., memory, disk drives, etc.) and may also be able to access a separate server data storage 112. Communication between server device 110 and server data storage 112 may be direct, via network 108, or both direct and via network 108 as illustrated in FIG. 1. Server data storage 112 may store application data that is used to facilitate the operations of applications performed by client devices 102, 104, and 106 and server device 110.

Although only three client devices, one server device, and one server data storage are shown in FIG. 1, communication system 100 may include any number of each of these components. For instance, communication system 100 may comprise millions of client devices, thousands of server devices and/or thousands of server data storages. Furthermore, client devices may take on forms other than those in FIG. 1.

B. Server Device

Figure 2A:
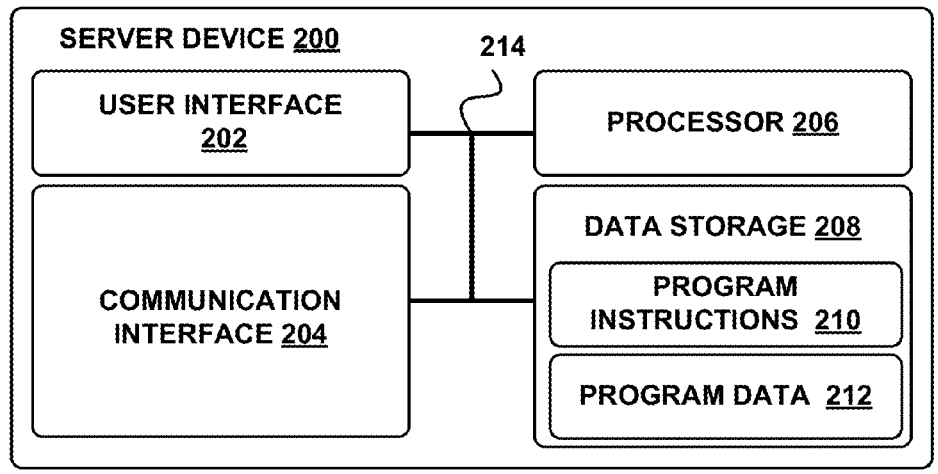
FIG. 2A is a block diagram of a server device, in accordance with an example embodiment.

FIG. 2A is a block diagram of a server device in accordance with an example embodiment. In particular, server device 200 shown in FIG. 2A can be configured to perform one or more functions of server device 110 and/or server data storage 112. Server device 200 may include a user interface 202, a communication interface 204, processor 206, and data storage 208, all of which may be linked together via a system bus, network, or other connection mechanism 214.

User interface 202 may comprise user input devices such as a keyboard, a keypad, a touch screen, a computer mouse, a track ball, a joystick, and/or other similar devices, now known or later developed. User interface 202 may also comprise user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. Additionally, user interface 202 may be configured to generate audible output(s), via a speaker, speaker jack, audio output port, audio output device, earphones, and/or other similar devices, now known or later developed. In some embodiments, user interface 202 may include software, circuitry, or another form of logic that can transmit data to and/or receive data from external user input/output devices.

Communication interface 204 may include one or more wireless interfaces and/or wireline interfaces that are configurable to communicate via a network, such as network 108 shown in FIG. 1. The wireless interfaces, if present, may include one or more wireless transceivers, such as a BLUE-TOOTH® transceiver, a Wifi transceiver perhaps operating in accordance with an IEEE 802.11 standard (e.g., 802.11b, 802.11g, 802.11n), a WiMAX transceiver perhaps operating in accordance with an IEEE 802.16 standard, a Long-Term Evolution (LTE) transceiver perhaps operating in accordance with a 3rd Generation Partnership Project (3GPP) standard, and/or other types of wireless transceivers configurable to communicate via local-area or wide-area wireless networks. The wireline interfaces, if present, may include one or more wireline transceivers, such as an Ethernet transceiver, a Universal Serial Bus (USB) transceiver, or similar transceiver configurable to communicate via a twisted pair wire, a coaxial cable, a fiber-optic link or other physical connection to a wireline device or network.

In some embodiments, communication interface 204 may be configured to provide reliable, secured, and/or authenticated communications. For each communication described herein, information for ensuring reliable communications (e.g., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, the data encryption standard (DES), the advanced encryption standard (AES), the Rivest, Shamir, and Adleman (RSA) algorithm, the Diffie-Hellman algorithm, and/or the Digital Signature Algorithm (DSA). Other cryptographic protocols and/or algorithms may be used instead of or in addition to those listed herein to secure (and then decrypt/decode) communications.

Processor 206 may include one or more general purpose processors (e.g., microprocessors) and/or one or more special purpose processors (e.g., digital signal processors (DSPs), graphical processing units (GPUs), floating point processing units (FPUs), network processors, or application specific integrated circuits (ASICs)). Processor 206 may be configured to execute computer-readable program instructions 210 that are contained in data storage 208, and/or other instructions, to perform various functions described herein.

Data storage 208 may include one or more non-transitory computer-readable storage media that can be read or accessed by processor 206. The one or more computer-readable storage media may include volatile and/or non-volatile storage components, such as optical, magnetic, organic or other memory or disc storage, which can be integrated in whole or in part with processor 206. In some embodiments, data storage 208 may be implemented using a single physical device (e.g., one optical, magnetic, organic or other memory or disc storage unit), while in other embodiments, data storage 208 may be implemented using two or more physical devices.

Data storage 208 may also include program data 212 that can be used by processor 206 to perform functions described herein. In some embodiments, data storage 208 may include, or have access to, additional data storage components or devices (e.g., cluster data storages described below).

C. Server Clusters

Server device 110 and server data storage device 112 may store applications and application data at one or more places accessible via network 108. These places may be data centers containing numerous servers and storage devices. The exact physical location, connectivity, and configuration of server device 110 and server data storage device 112 may be unknown and/or unimportant to client devices. Accordingly, server device 110 and server data storage device 112 may be referred to as "cloud-based" devices that are housed at various remote locations. One possible advantage of such "could-based" computing is to offload processing and data storage from client devices, thereby simplifying the design and requirements of these client devices.

In some embodiments, server device 110 and server data storage device 112 may be a single computing device residing in a single data center. In other embodiments, server device 110 and server data storage device 112 may include multiple computing devices in a data center, or even multiple computing devices in multiple data centers, where the data centers are located in diverse geographic locations. For example, FIG. 1 depicts each of server device 110 and server data storage device 112 potentially residing in a different physical location.

Figure 2B:
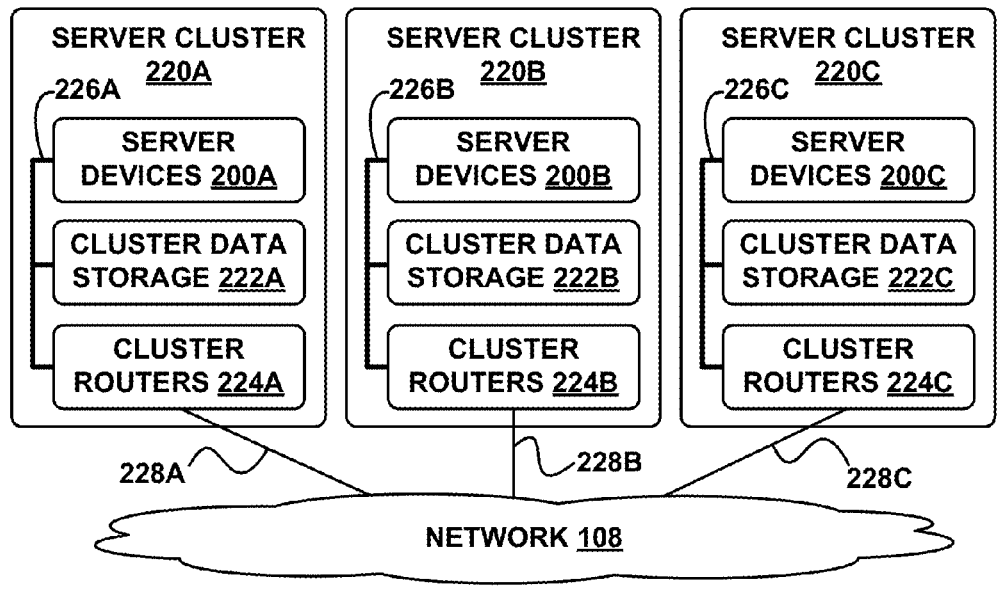
FIG. 2B depicts a cloud-based server system, in accordance with an example embodiment.

FIG. 2B depicts a cloud-based server cluster in accordance with an example embodiment. In FIG. 2B, functions of server device 110 and server data storage device 112 may be distributed among three server clusters 220a, 220b, and 220c. Server cluster 220a may include one or more server devices 200a, cluster data storage 222a, and cluster routers 224a connected by a local cluster network 226a. Similarly, server cluster 220b may include one or more server devices 200b, cluster data storage 222b, and cluster routers 224b connected by a local cluster network 226b. Likewise, server cluster 220c may include one or more server devices 200c, cluster data storage 222c, and cluster routers 224c connected by a local cluster network 226c. Server clusters 220a, 220b, and 220c may communicate with network 108 via communication links 228a, 228b, and 228c, respectively.

In some embodiments, each of the server clusters 220a, 220b, and 220c may have an equal number of server devices, an equal number of cluster data storages, and an equal number of cluster routers. In other embodiments, however, some or all of the server clusters 220a, 220b, and 220c may have different numbers of server devices, different numbers of cluster data storages, and/or different numbers of cluster routers. The number of server devices, cluster data storages, and cluster routers in each server cluster may depend on the computing task(s) and/or applications assigned to each server cluster.

In the server cluster 220a, for example, server devices 200a can be configured to perform various computing tasks of server device 110. In one embodiment, these computing tasks can be distributed among one or more of server devices 200a. Server devices 200b and 200c in server clusters 220b and 220c may be configured the same or similarly to server devices 200a in server cluster 220a. On the other hand, in some embodiments, server devices 200a, 200b, and 200c each may be configured to perform different functions. For example, server devices 200a may be configured to perform one or more functions of server device 110, and server devices 200b and server device 200c may be configured to perform functions of one or more other server devices. Similarly, the functions of server data storage device 112 can be dedicated to a single server cluster, or spread across multiple server clusters.

Cluster data storages 222a, 222b, and 222c of the server clusters 220a, 220b, and 220c, respectively, may be data storage arrays that include disk array controllers configured to manage read and write access to groups of hard disk drives. The disk array controllers, alone or in conjunction with their respective server devices, may also be configured to manage backup or redundant copies of the data stored in cluster data storages to protect against disk drive failures or other types of failures that prevent one or more server devices from accessing one or more cluster data storages.

Similar to the manner in which the functions of server device 110 and server data storage device 112 can be distributed across server clusters 220a, 220b, and 220c, various active portions and/or backup/redundant portions of these components can be distributed across cluster data storages 222a, 222b, and 222c. For example, some cluster data storages 222a, 222b, and 222c may be configured to store backup versions of data stored in other cluster data storages 222a, 222b, and 222c.

Cluster routers 224a, 224b, and 224c in server clusters 220a, 220b, and 220c, respectively, may include networking equipment configured to provide internal and external communications for the server clusters. For example, cluster routers 224a in server cluster 220a may include one or more packet-switching and/or routing devices configured to provide (i) network communications between server devices 200a and cluster data storage 222a via cluster network 226a, and/or (ii) network communications between the server cluster 220a and other devices via communication link 228a to network 108. Cluster routers 224b and 224c may include network equipment similar to cluster routers 224a, and cluster routers 224b and 224c may perform networking functions for server clusters 220b and 220c that cluster routers 224a perform for server cluster 220a.

Additionally, the configuration of cluster routers 224a, 224b, and 224c can be based at least in part on the data communication requirements of the server devices and cluster storage arrays, the data communications capabilities of the network equipment in the cluster routers 224a, 224b, and 224c, the latency and throughput of the local cluster networks 226a, 226b, 226c, the latency, throughput, and cost of the wide area network connections 228a, 228b, and 228c, and/or other factors that may contribute to the cost, speed, fault-tolerance, resiliency, efficiency and/or other design goals of the system architecture.

D. Client Device

Figure 3:
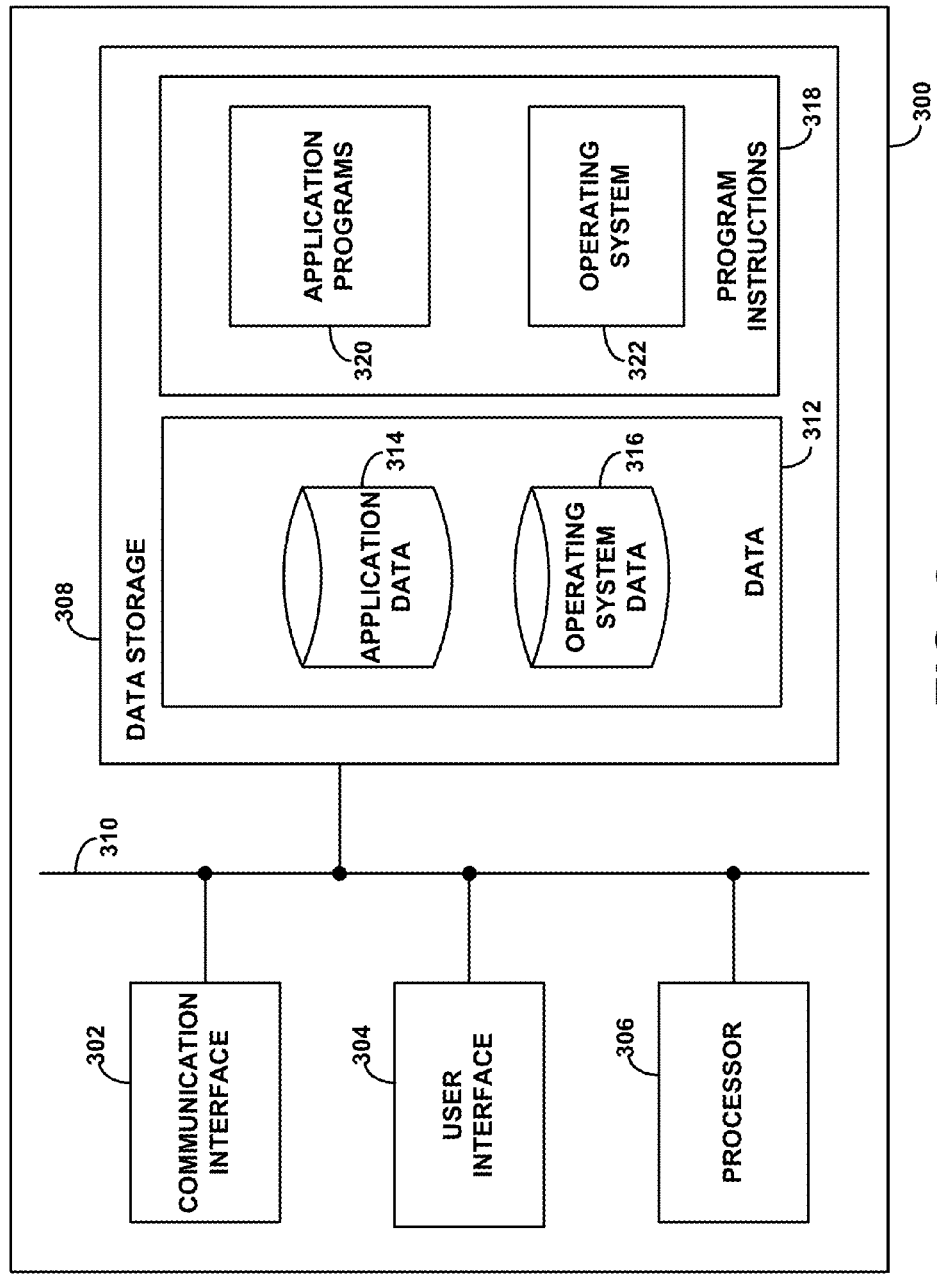
FIG. 3 depicts a block diagram of a client device, in accordance with an example embodiment.

FIG. 3 is a simplified block diagram showing some of the components of an example client device 300. By way of example and without limitation, client device 300 may be a "plain old telephone system" (POTS) telephone, a cellular mobile telephone, a still camera, a video camera, a fax machine, an answering machine, a computer (such as a desktop, notebook, or tablet computer), a personal digital assistant (PDA), a home automation component, a digital video recorder (DVR), a digital TV, a remote control, or some other type of device equipped with one or more wireless or wired communication interfaces.

As shown in FIG. 3, client device 300 may include a communication interface 302, a user interface 304, a processor 306, and data storage 308, all of which may be communicatively linked together by a system bus, network, or other connection mechanism 310.

Communication interface 302 functions to allow client device 300 to communicate, using analog or digital modulation, with other devices, access networks, and/or transport networks. Thus, communication interface 302 may facilitate circuit-switched and/or packet-switched communication, such as POTS communication and/or IP or other packetized communication. For instance, communication interface 302 may include a chipset and antenna arranged for wireless communication with a radio access network or an access point. Also, communication interface 302 may take the form of a wireline interface, such as an Ethernet, Token Ring, or USB port. Communication interface 302 may also take the form of a wireless interface, such as a Wifi, BLUETOOTH®, global positioning system (GPS), or wide-area wireless interface (e.g., WiMAX or LTE). However, other forms of physical layer interfaces and other types of standard or proprietary communication protocols may be used over communication interface 302. Furthermore, communication interface 302 may comprise multiple physical communication interfaces (e.g., a Wifi interface, a BLUETOOTH® interface, and a wide-area wireless interface).

User interface 304 may function to allow client device 300 to interact with a human or non-human user, such as to receive input from a user and to provide output to the user. Thus, user interface 304 may include input components such as a keypad, keyboard, touch-sensitive or presence-sensitive panel, computer mouse, trackball, joystick, microphone, still camera and/or video camera. User interface 304 may also include one or more output components such as a display screen (which, for example, may be combined with a touch-sensitive panel), CRT, LCD, LED, a display using DLP technology, printer, light bulb, and/or other similar devices, now known or later developed. User interface 304 may also be configured to generate audible output(s), via a speaker, speaker jack, audio output port, audio output device, earphones, and/or other similar devices, now known or later developed. In some embodiments, user interface 304 may include software, circuitry, or another form of logic that can transmit data to and/or receive data from external user input/output devices. Additionally or alternatively, client device 300 may support remote access from another device, via communication interface 302 or via another physical interface (not shown).

Processor 306 may comprise one or more general purpose processors (e.g., microprocessors) and/or one or more special purpose processors (e.g., DSPs, GPUs, FPUs, network processors, or ASICs). Data storage 308 may include one or more volatile and/or non-volatile storage components, such as magnetic, optical, flash, or organic storage, and may be integrated in whole or in part with processor 306. Data storage 308 may include removable and/or non-removable components.

Generally speaking, processor 306 may be capable of executing program instructions 318 (e.g., compiled or non-compiled program logic and/or machine code) stored in data storage 308 to perform the various functions described herein. Therefore, data storage 308 may include a non-transitory computer-readable medium, having stored thereon program instructions that, upon execution by client device 300, cause client device 300 to perform any of the methods, processes, or functions disclosed in this specification and/or the accompanying drawings. The execution of program instructions 318 by processor 306 may result in processor 306 using data 312.

By way of example, program instructions 318 may include an operating system 322 (e.g., an operating system kernel, device driver(s), and/or other modules) and one or more application programs 320 (e.g., address book, email, web browsing, social networking, and/or gaming applications) installed on client device 300. Similarly, data 312 may include operating system data 316 and application data 314. Operating system data 316 may be accessible primarily to operating system 322, and application data 314 may be accessible primarily to one or more of application programs 320. Application data 314 may be arranged in a file system that is visible to or hidden from a user of client device 300.

Application programs 320 may communicate with operating system 312 through one or more application programming interfaces (APIs). These APIs may facilitate, for instance, application programs 320 reading and/or writing application data 314, transmitting or receiving information via communication interface 302, receiving or displaying information on user interface 304, and so on.

In some vernaculars, application programs 320 may be referred to as "apps" for short. Additionally, application programs 320 may be downloadable to client device 300 through one or more online application stores or application markets. However, application programs can also be installed on client device 300 in other ways, such as via a web browser or through a physical interface (e.g., a USB port) on client device 300.

3. Tasks with Distributed Activities

Figure 4:
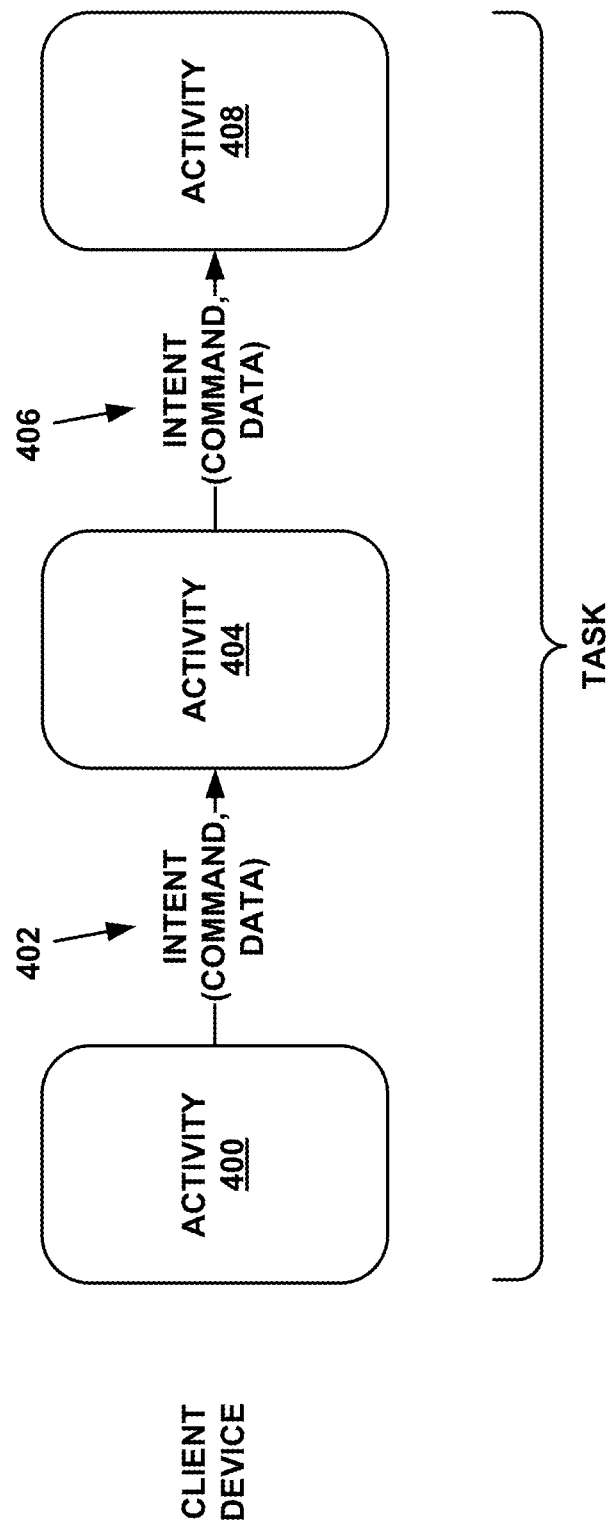
FIG. 4 is a block diagram representing a series of activities, in accordance with an example embodiment.

FIG. 4 is a block diagram representing a series of activities performed on a client device. The client device may be any type of client device, such as client device 300. The performance of these activities may result in the accomplishment of a task. In FIG. 4, activity 400 may be followed by activity 404, and activity 404 may be followed by activity 408. Further, activity 400 may be linked to activity 404 by intent 402, and activity 404 may be linked to activity 408 by intent 406. Each of activities 400, 404, and 408 may denote, for instance, an application, a state of an application, and/or a screen displayed by an application.

As an example of the types of activities that the block diagram of FIG. 4 might represent, activity 400 could be an email application displaying an email. The email could contain a link (e.g., a URL), or some other type of reference, to a web site. If the user clicks on the link, an intent (i.e., intent 402) to use the client device's web browser to access the web site may be generated. This intent may take the form of a message generated by the email application. Alternatively, this message may be generated by the client device's operating system or by some other application operating on the client device. The message may include a command (such as a "GET" or "OPEN" directive), data (e.g., the URL), and a destination (e.g., the web browser application).

If the web browser is operating on the client device, the intent may be delivered to the web browser. If the web browser is not operating on the client device, the web browser application may be launched (e.g., by the client device's operating system), and then the intent may be delivered to the web browser. The intent may be transmitted and received via various types of communication techniques, including but not limited to inter-process communication. Possibly in response to receiving the intent, the web browser may invoke the command on the data. Accordingly, the web browser may retrieve and display the web page as activity 404.

This web page may, in turn, contain a link, or some other type of reference, to a video that can be played by the client device. If the user clicks on this link, another intent (i.e., intent 406) to use the client device's media player to play the video may be formed. This intent may also take the form of a message containing a command (e.g., a "PLAY" directive), data (e.g., a URL of where the video can be found), and a destination (e.g., the media player).

Like the message sent to the web browser, if the media player is operating on the client device, the intent may be delivered to the media player. If the media player is not operating on the client device, the media player application may be launched (e.g., by the client device's operating system), and then the intent may be delivered to the media player. Possibly in response to receiving the intent, the media player may invoke the command on the data. Accordingly, the media player may retrieve and play the video as activity 408.

This is just one possible example of a combination of activities making up a task. The block diagram of FIG. 4 could represent other combinations of activities arranged to accomplish other tasks. Nonetheless, in this example, each of the activities, as well as the task, are performed on the same client device. The embodiments herein introduce, among other features, the ability to distribute activities of a task across multiple client devices.

Figure 5:
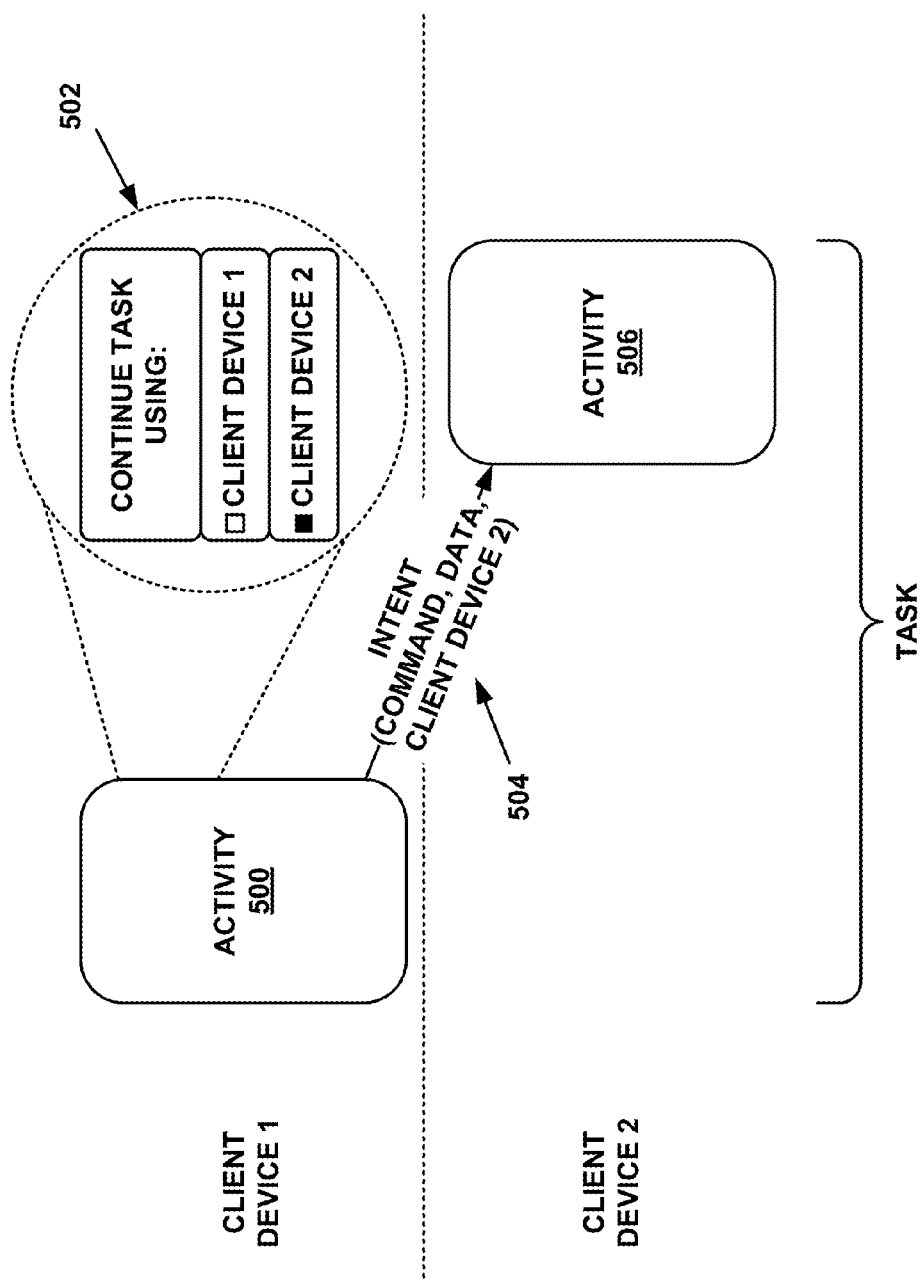
FIG. 5 is a block diagram representing activities from the same task being performed on two different client devices, in accordance with an example embodiment.

FIG. 5 is a block diagram representing activities from the same task being performed on two different client devices. In this block diagram, activity 500 is performed on client device 1. Either during or after the performance of activity 500, client device 1 may transmit an intent 504 to client device 2. Intent 504 may contain a command and data, and may also indicate that client device 2 is destination of intent 504. In response to receiving intent 504, client device 2 may perform activity 506.

Optionally, prior to transmitting the intent, client device 1 may display a menu, such as dialog box 502, in order to allow the user of client device 1 to choose where to complete the task. The user may choose to complete the task on client device 1, which may result in the intent being transmitted to an application on client device 1. Alternatively, and as shown in FIG. 5, the user may choose to complete the task on client device 2, which may result in the intent being transmitted to an application on client device 2. The intent may be transmitted and received via various types of communication techniques, including but not limited to inter-device network communication.

In some situations it may be advantageous to perform some activities of a task on a first client device and other activities of the task on a second client device. For instance, a user may be browsing the web on his or her cell phone. During this browsing, the user may come across a video that he or she would like to view. However, many cell phone display screens are rather small. Thus, the user may prefer to view the video on another device, such as his or her tablet computer, personal computer, or television. Being able to transfer the activity of playing the video from the cell phone to one of these other devices may satisfy the user's preference.

Figure 6:
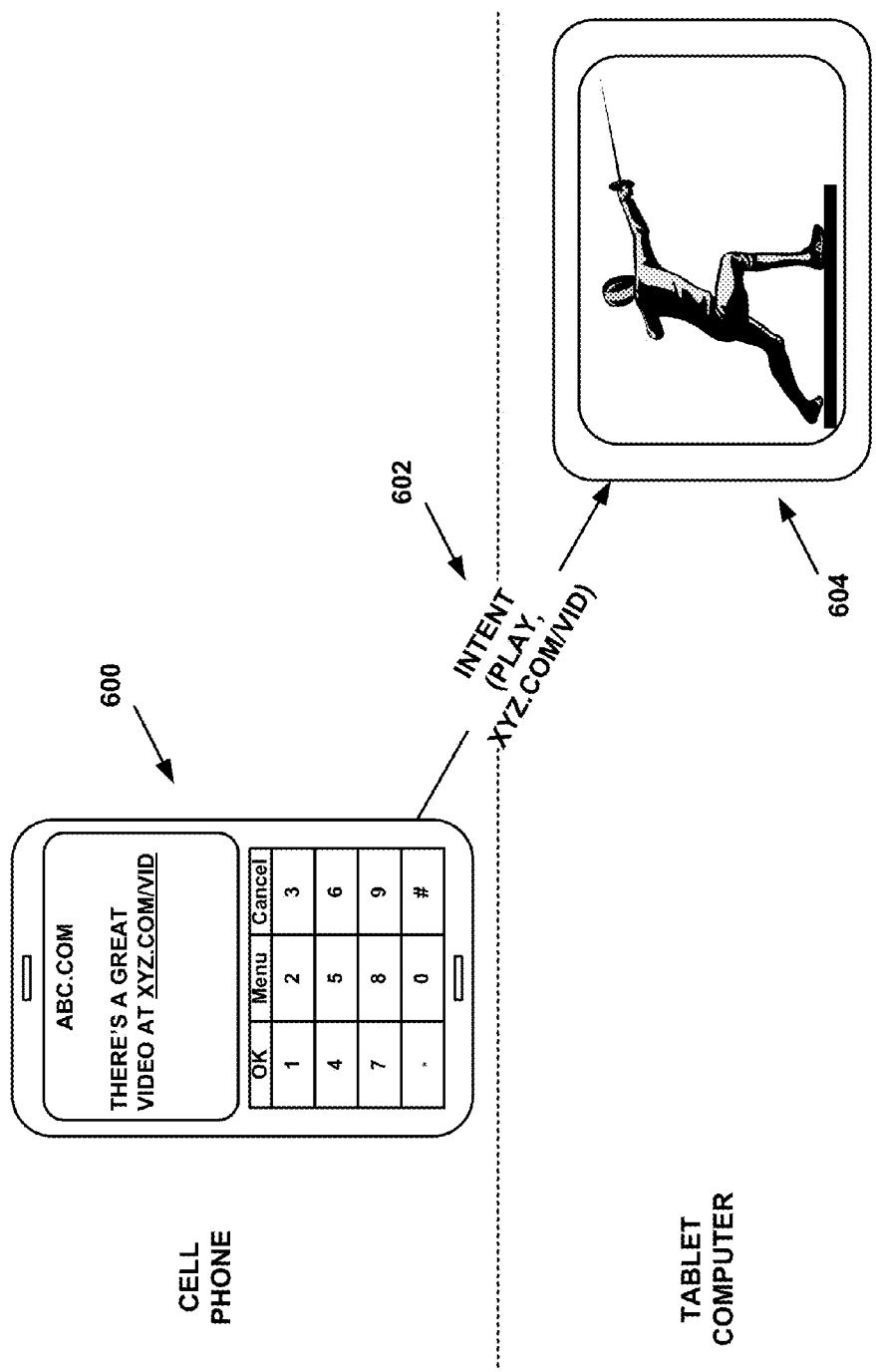
FIG. 6 depicts distribution of tasks between a cell phone and a tablet computer, in accordance with an example embodiment.

For example, FIG. 6 depicts the distribution of tasks between a cell phone 600 and a tablet computer 604. Note that for sake of illustration, the sizes of these devices are not to scale. In many embodiments, cell phone 600 may be smaller than tablet computer 604.

In this example, a user uses a web browser on cell phone 600 to view a web page on web site abc.com. As shown in FIG. 6, this web page may contain a link to a video on web site xyz.com. Further, the user may wish to view the video on tablet computer 604, perhaps due to tablet computer 604 having a larger display screen. Accordingly, the user may indicate this wish to cell phone 600, such as via a menu like dialog box 502, and cell phone 600 may transmit an intent 602 to tablet computer 604. This intent may contain a URL of the video as data and a command instructing the tablet computer to play the video referred to by the URL.

The distribution of tasks shown in FIG. 6 is just one possible embodiment. A number of other embodiments that distribute tasks between client devices are possible. For instance, a user might be watching a television program that displays a phone number that can be called to order merchandise. The television may be a networked device, with the ability to support circuit-switched or packet-switched telephony. Thus, the user may be able to instruct the television to call the phone number so that the user can order the merchandise. However, it may be more convenient for the user to conduct the call via his or her cell phone. Therefore, perhaps via a remote control, the user may indicate to the television that he or she would like to distribute the activity of placing a call to the cell phone.

The television may then transmit an intent to the cell phone containing the phone number as data and a command instructing the cell phone to call the phone number.

In another possible embodiment, a user might take a picture using his or her cell phone. The user may want to post a copy of the picture to a social networking site, and annotate the picture with some comments. However, the small keyboard or keypad of a cell phone may make extensive typing inconvenient. Thus, the user may upload the picture to the social networking site, then indicate to the cell phone that he or she would like to distribute the activity of annotating the picture to the user's personal computer. The cell phone may transmit an intent to the personal computer containing a reference to the posted picture as data, and a command instructing the personal computer to open a dialog box for the user to comment on the picture. Alternatively, the user may indicate to the cell phone that he or she would like to distribute the activity of uploading and annotating the picture to the user's personal computer. Then, the cell phone may transmit an intent to the personal computer containing the picture and a reference to the social networking site as data, and a command instructing the personal computer to upload the picture and/or open a dialog box for the user to comment on the picture.

In yet another possible embodiment, a task taking place on a client device can dynamically be divided into discrete activities, and one or more of these activities can be distributed to other client devices. For instance, suppose that a user starts watching a video (e.g., a long video, such as a movie) on a television in his or her family room. At some point during the course of the video's playout, the user may wish to finish watching the movie on the television in his or her bedroom. Therefore, again perhaps via a remote control, the user may indicate to the family room television that he or she would like to complete the task of viewing the video on the bedroom television. This may result in the video playout on the family room television being stopped, and the task of viewing the video being logically divided into two activities: the first activity of viewing the video to the point where it was stopped, and the second activity of viewing the video from the point where it was stopped to the video's end. This second activity would then be transferred to the bedroom television. In particular, the family room television may transmit an intent to the bedroom television containing reference to the video at the point at which it was stopped, and a command instructing the bedroom television to play out the video from that point.

It should be understood that a task may be able to be divided into any number of discrete activities, and these activities may be able to be distributed amongst any number of client devices in order to perform the task. Additionally, the activities of a task need not occur in any particular order, or within any particular time frame. Thus, for instance, a task that involves watching a video may be divided into activities that take place on several different client devices over the course of several hours, days, weeks, etc. Further, the division of a task into activities may occur dynamically.

In addition to the embodiments described above, other embodiments may involve a task being distributed amongst client devices such that an initial activity of the task is carried out on a first client device, a subsequent activity of the task is carried out on a second client device, and then the first client device either continues to perform the initial activity or carries out yet another activity of the task. This may be advantageous when, for example, the first client device has a form factor and/or capabilities that more easily facilitate certain activities, while the second client device has a different form factor and/or capabilities that facilitate other activities.

Figure 7:
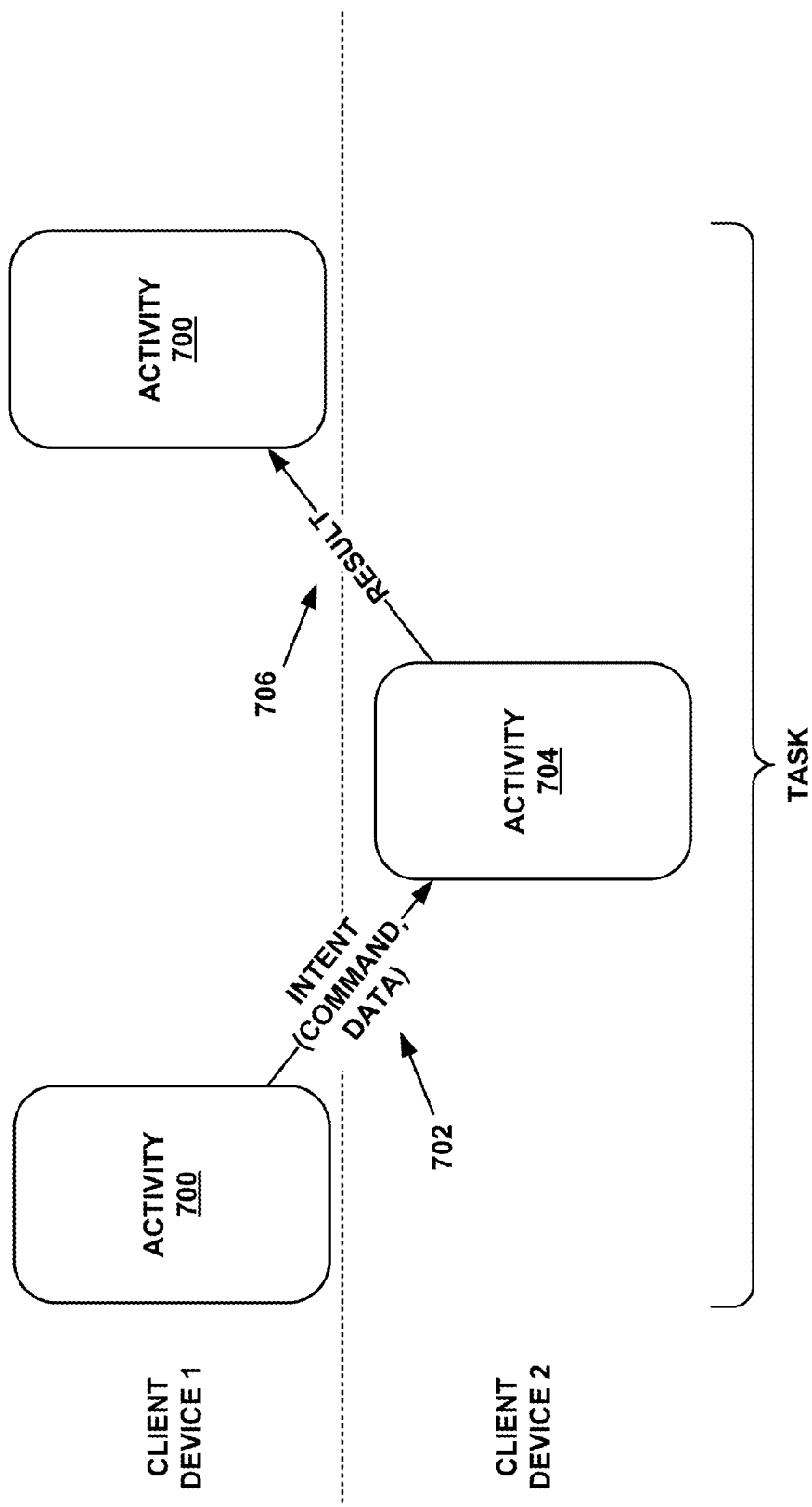
FIG. 7 is another block diagram representing activities from the same task being performed on two different client devices, in accordance with an example embodiment.

FIG. 7 is a block diagram representing activities from the same task being performed on two different client devices in such a fashion. In this block diagram, activity 700 is performed on client device 1. Either during or after the performance of activity 700, client device 1 transmits, to client device 2, an intent 702 containing a command and data. Intent 702 may also indicate that client device 2 is destination of intent 702. In response to receiving intent 702, client device 2 may perform activity 704.

Either during or after the performance of activity 704, client device 2 may transmit a result 706 to client device 1. Result 706 may take the form of a message that contains data from client device 2 that is related to the performance of activity 704. This data may be stored on client device 2, or may have been generated by client device 2 before, during or after the performance of activity 704.

Thus, a result may include data and a destination. Accordingly, result 706 may include data generated by client device 2, and a destination of client device 1. In some cases, a result may also include a command as well. In response to receiving result 706, client device 1 may either continue performing activity 700, or may perform a different activity of the task.

Figure 8:
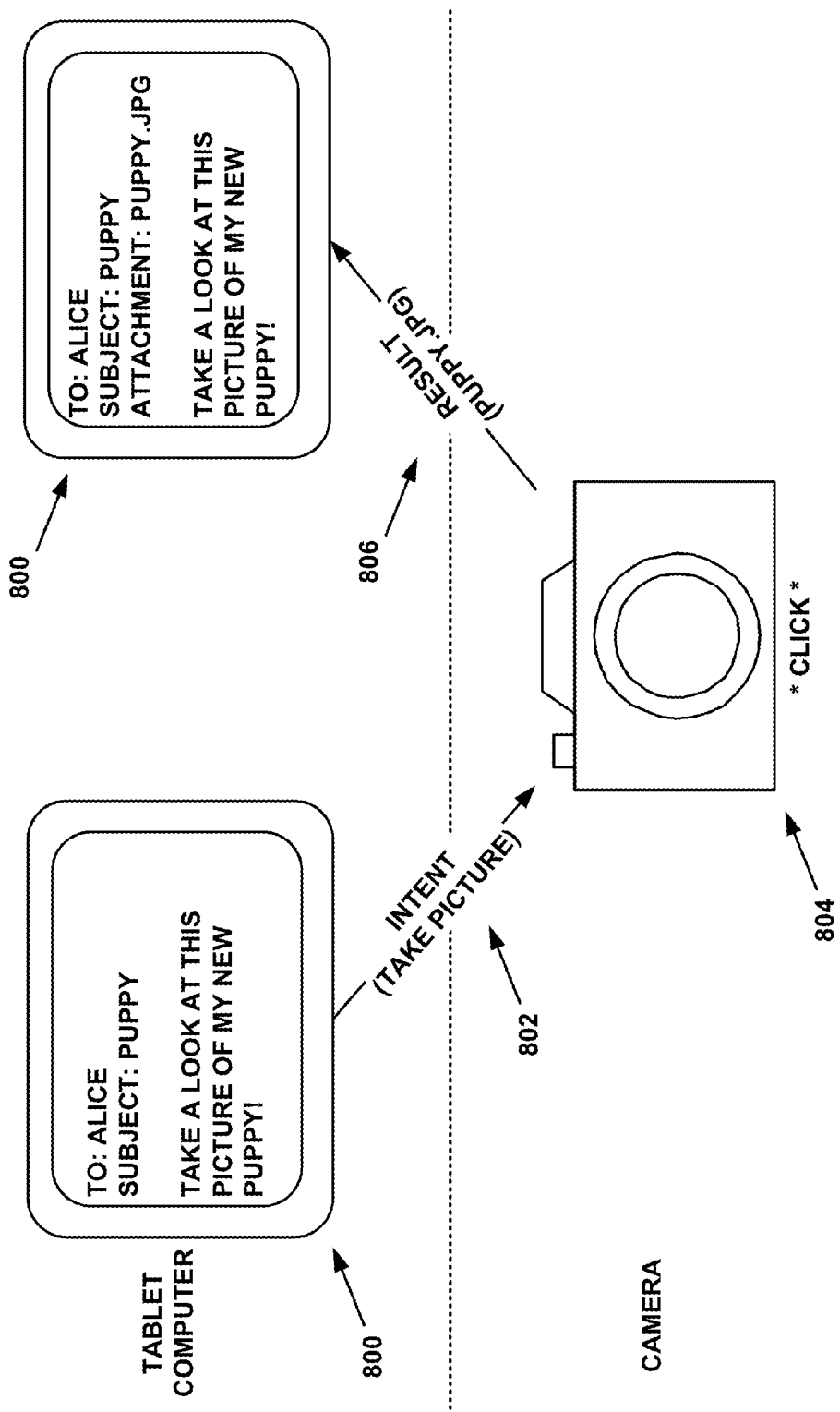
FIG. 8 depicts the distribution of tasks between a tablet computer and a camera, in accordance with an example embodiment.

As an example of task distribution in accordance with FIG. 7, FIG. 8 depicts distributing tasks between a tablet computer 800 and a camera 804. A user may be using an email client on tablet computer 800 to draft an email. As shown in FIG. 8, the user may wish to attach a picture of his or her new puppy to the email. While tablet computer 800 might have a built-in camera, the user might prefer to use stand-alone camera 804 to take the picture. For instance, camera 804 might be a better form factor for taking the picture, and/or may have superior photographic capabilities. Accordingly, the user may indicate this preference to tablet computer 800, such as via a menu like dialog box 502, and tablet computer 800 may transmit an intent 802 to camera 804. This intent may contain a command for camera 804 to take a picture.

Perhaps in response to receiving intent 802, camera 804 may either take a picture, or place itself in a picture-taking mode so that the user can trigger a picture to be taken. After the picture is taken, camera 804 may transmit a copy of the picture in a result 806 back to tablet computer 800. Tablet computer 800 may, in turn, automatically incorporate the picture into the draft email as an attachment. Alternatively, tablet computer 800 may prompt the user so that the user can manually attach the picture. Then, the user may continue drafting the email and/or send the email to its recipient(s).

The distribution of tasks shown in FIG. 8 is just one possible embodiment of how activities from a task can be distributed between client devices such that activities are initially performed on a first client device, subsequently on a second client device, and then once again on the first client device. It may be possible to distribute different tasks comprising different activities amongst different types of devices.

4. Association of Client Devices

In order to distribute tasks securely and efficiently amongst client devices, it may be beneficial to form associations between these client devices. The associations may be formed prior to activities being distributed amongst the client devices, or during distribution of the activities amongst the client devices. Once two or more client devices are associated, at least one of the client devices may distribute activities to the other client device(s). In some embodiments, if two client devices are not associated, each client device will not be able to distribute activities to the other client device. This may serve to prevent a client device from distributing part of a task to a receiving device without the receiving device's permission.

Figure 9:
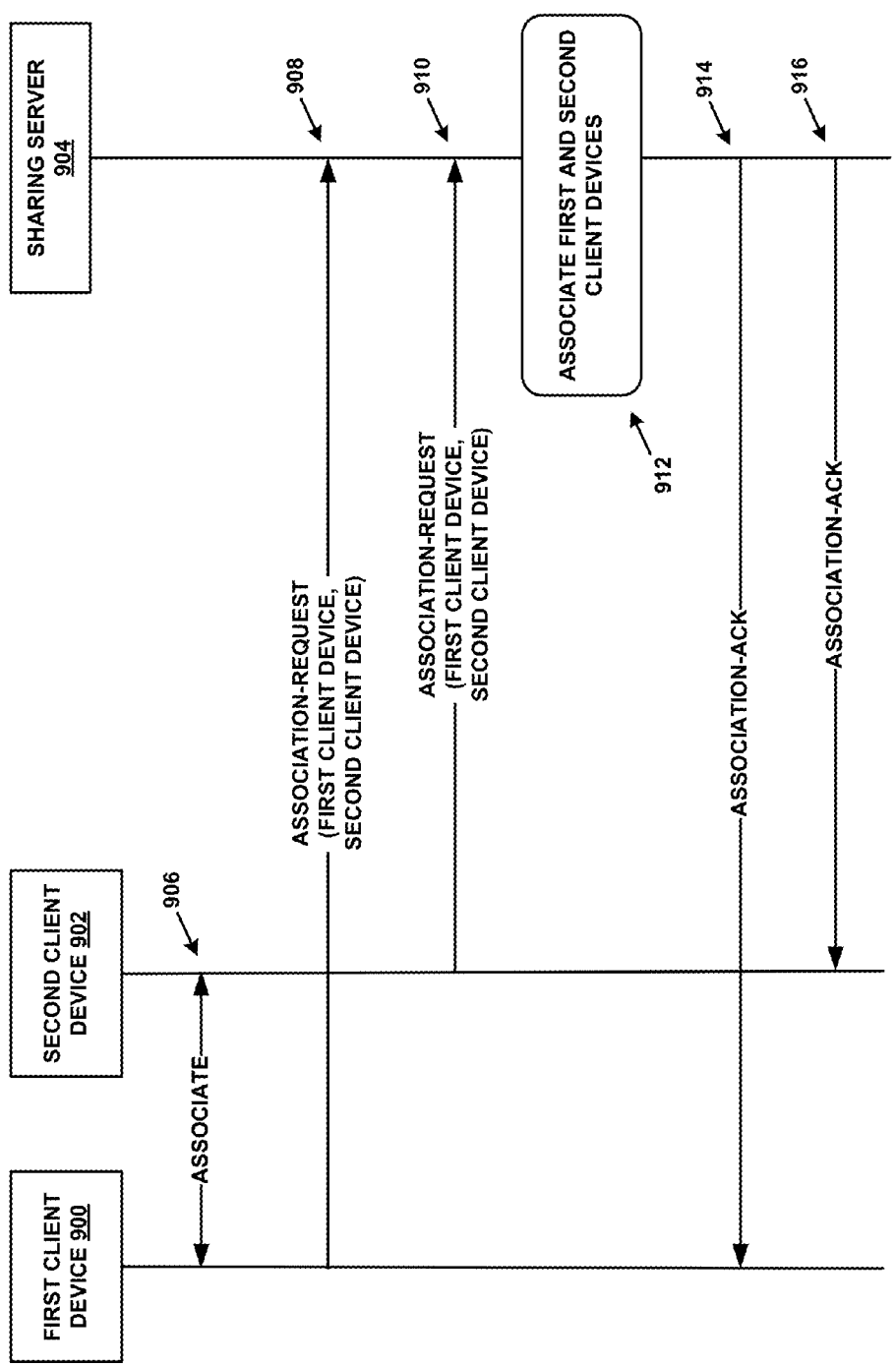
FIG. 9 is a message flow that exemplifies one possible way of forming an association between two client devices, in accordance with an example embodiment.

FIG. 9 is a message flow that exemplifies one possible way of forming an association between two client devices. However, there may be other ways of forming such an association using more or fewer messages, different types of messages, and/or messages occurring in a different order. Further, the message flow of FIG. 9 includes a first client device 900 forming an association with a second client device 902, facilitated by a sharing server 904. However, this sharing server is optional, and associations may be formed directly between two or more client devices.

At step 906, first client device 900 and second client device 902 may communicate to form an association. This communication may take various forms, such as an exchange of messages in which first client device 900 and second client device 902 agree to be associated with one another. On the other hand, step 906 may include procedures in which a user enters information manually into both first client device 900 and second client device 902 regarding the association, or some combination of manual and non-manual procedures.

For example, second client device 902 may display an indication of its identity. This indication may be a bar code, a QR code, text, or some other representation, and may appear physically on second client device 902 (e.g., imprinted on second client device 902 or on a sticker affixed to second client device 902). Alternatively, the indication may appear on a display screen of client device 902. A user may enter such an indication into first client device 900, thereby initiating the association. Or, the user may use first client device 900 to take a picture of this indication to initiate the association.

Regardless, at step 908, first client device 900 may transmit an association-request message to sharing server 904. This association-request message may contain identifying information of the first client device 900 and/or the second client device 902. Similarly, at step 910, second client device 902 may transmit another association-request message to sharing server 904. This association-request message may also contain identifying information of the first client device 900 and/or the second client device 902. Both association-request messages may seek to form the association between first client device 900 and second client device 902.

At step 912, perhaps in response to receiving the association-request messages, sharing server 904 may form an association between first client device 900 and second client device 902. Sharing server 904 may also store this association for later use. Then, at steps 914 and 916 respectively, sharing server 904 may transmit association-acknowledgement messages to first client device 900 and second client device 902. Once the association is acknowledged and the client devices are aware of this acknowledgement, the association may be used to distribute activities amongst the client devices.

Alternatively or additionally, it may be possible to utilize existing associations between two client devices to distribute activities amongst these devices, rather than form new associations between the devices. For instance, if each of the respective users of two or more client devices is already associated, perhaps via a social networking service or an instant messaging service, this association may allow the client devices to distribute activities to one another.

5. Example Operations

Figure 10:
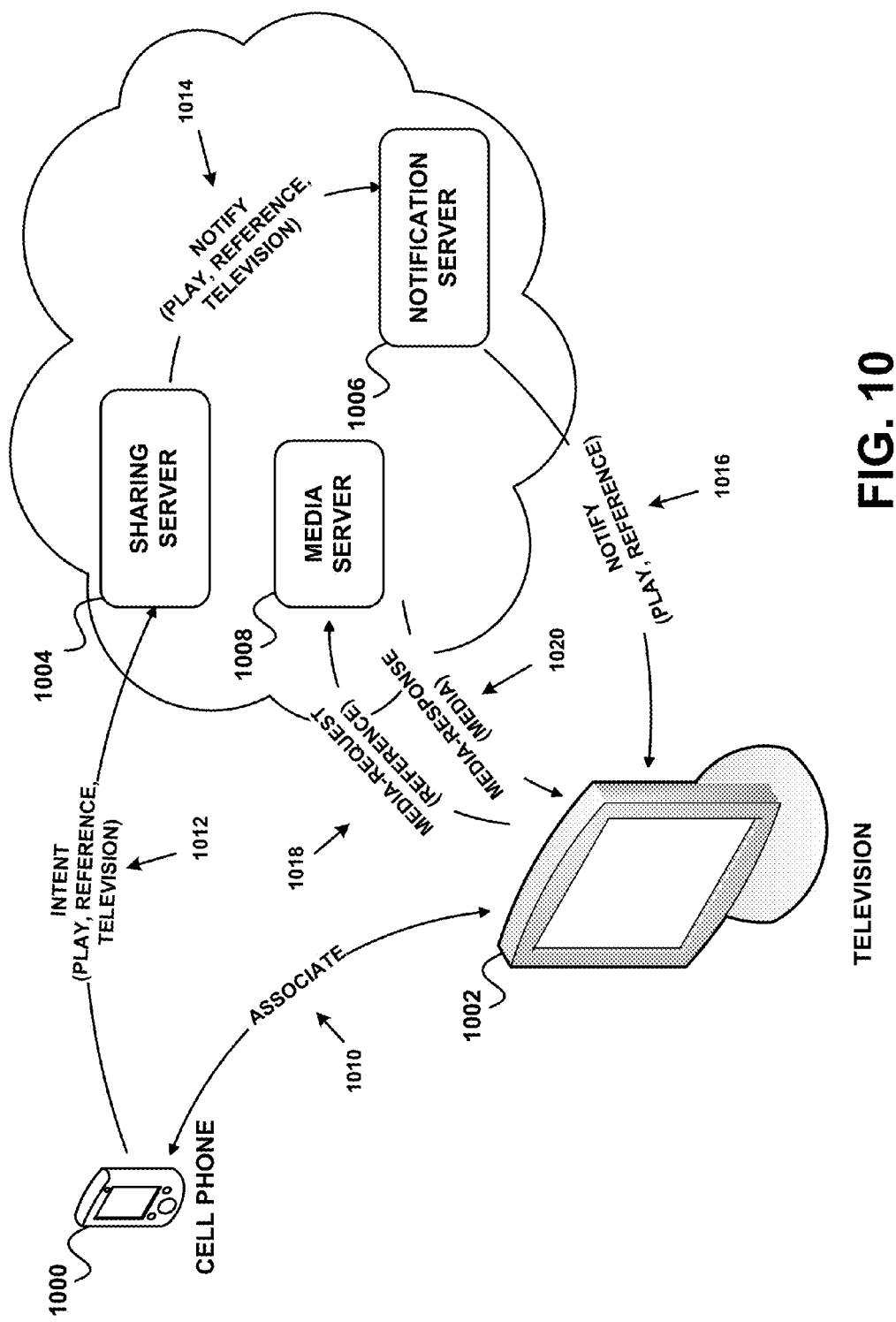
FIG. 10 is a message flow for distributing activities, in accordance with an example embodiment.

FIG. 10 is an example message flow for distributing activities. The message flow of FIG. 10 could, for example, relate to the scenarios described in reference to FIGS. 5 and 6, in which a task is distributed between two or more client devices.

Particularly, in FIG. 10, the client devices include cell phone 1000 and television 1002. The distribution of activities is facilitated by sharing server 1004, notification server 1006, and media server 1008. However, it should be noted that the functions of any two, or all three, of these servers may be combined with one another. Alternatively or additionally, the functions of any one server may be distributed across multiple physical devices. Generally speaking, sharing server 1004, notification server 1006, and media server 1008 may be part of one or more server clusters, such as those depicted in FIG. 2B.

At step 1010, an association between cell phone 1000 and television 1002 may be formed. This step may involve messaging not shown in FIG. 10, such as some or all of the messaging of FIG. 9, or other messaging that forms the association.

At step 1012, cell phone 1000 may transmit, to sharing server 1004, a message containing an intent. The intent may, in turn, include a reference to media (e.g., a URL at which a video can be found), a command to play the media, and a destination of television 1002.

At step 1014, sharing server 1004 may transmit a notification to notification server 1006. The notification may contain some or all of the information contained in the intent transmitted in step 1012.

At step 1016, notification server 1006 may transmit a notification to television 1002. This notification may also contain some or all of the information contained in the intent transmitted in step 1012. Particularly, as shown in FIG. 10, this notification may include at least the reference to the media and the command to play the media. In some embodiments, notification server 1006 may be dedicated to receiving notifications, from sharing server 1004 and possibly other servers as well, and forwarding at least some of these notifications to client devices. Nonetheless, as noted above, the functions of notification server 1006 could be combined with those of other servers.

At step 1018, perhaps in response to receiving the notification, television 1002 may transmit a media-request message to media server 1008. The media-request message may include the reference to the media.

At step 1020, perhaps in response to receiving the media-request message, media server 1008 may transmit a media-response message to television 1002. The media-response message may contain at least part of the media requested in step 1018. Upon or after receiving the media, television 1002 may play out some or all of the media.

Steps 1018 and 1020 may be carried out in accordance with one or more protocols, such as the Session Initiation Protocol (SIP), Real Time Streaming Protocol (RTSP), Hypertext Transfer Protocol (HTTP), and/or File Transfer Protocol (FTP).

Overall, the message flow of FIG. 10 illustrates, for example, transferring the playout of a video from a cell phone with a small screen to a television with a larger screen. However, the same or a similar message flow can be used to distribute different tasks amongst different devices.

Figure 11:
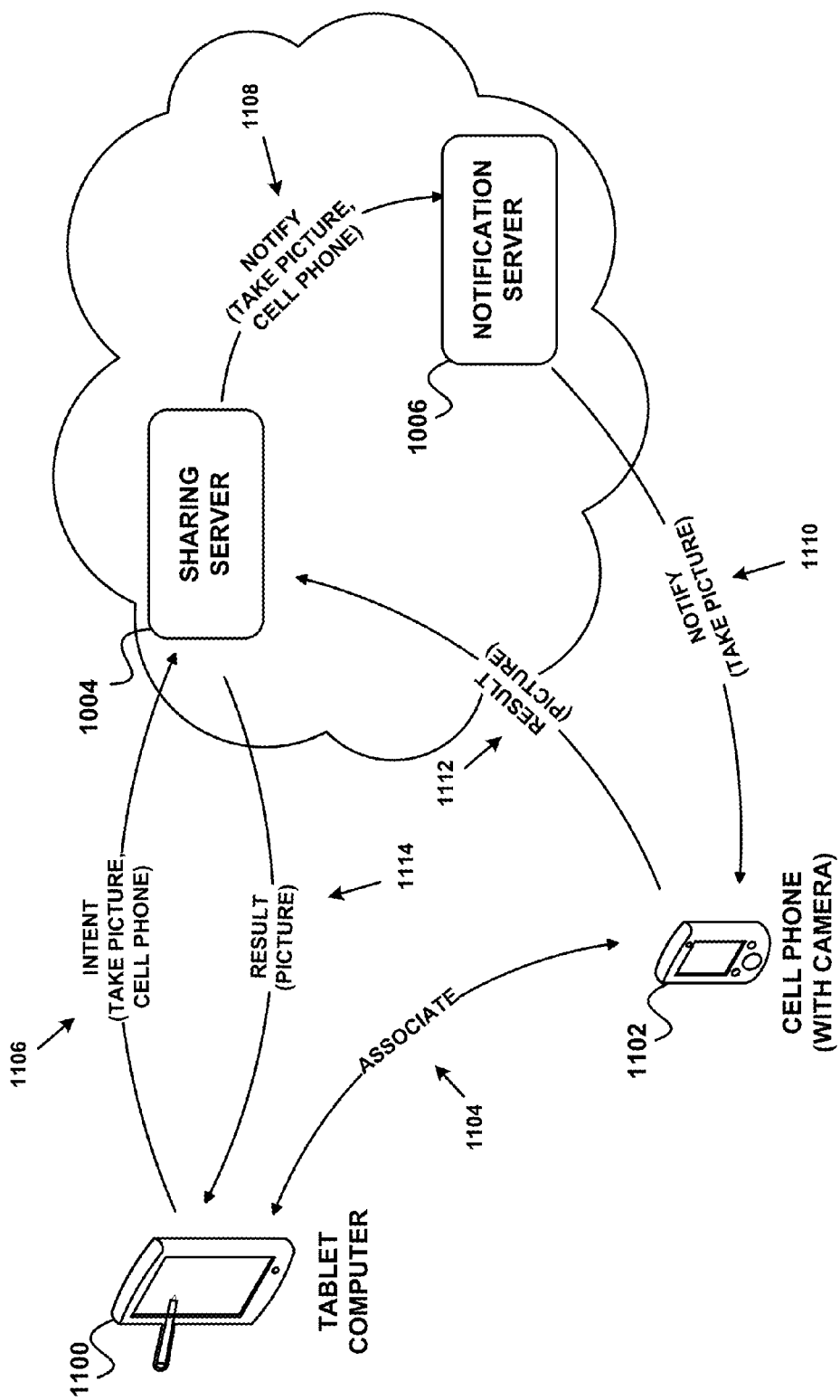
FIG. 11 is another message flow for distributing activities, in accordance with an example embodiment.

Like FIG. 10, FIG. 11 is a message flow for distributing activities. The message flow of FIG. 11 is related to the scenarios described in reference to FIGS. 7 and 8, in which a task is distributed such that an initial activity of the task is carried out on a first client device, a subsequent activity of the task is carried out on a second client device, and then the first client device either continues to perform the initial activity or carries out yet another activity of the task.

In FIG. 11, the client devices include tablet computer 1100 and cell phone 1102. Cell phone 1102 may include a camera function capable of taking pictures. The distribution of activities is facilitated by sharing server 1004 and notification server 1006.

At step 1104, an association between tablet computer 1100 and cell phone 1102 may be formed. This step may involve messaging not shown in FIG. 11, such as some or all of the messaging of FIG. 9, or other messaging that forms the association.

At step 1106, tablet computer 1100 may transmit, to sharing server 1104, a message containing an intent. The intent may, in turn, include a command to take a picture, and a destination of cell phone 1102. Tablet computer 1100 may transmit the intent during or after performing an activity of a task.

At step 1108, sharing server 104 may transmit a notification to notification server 1006. The notification may contain some or all of the information contained in the intent transmitted in step 1106.

At step 1110, notification server 1006 may transmit a notification to cell phone 1102. This notification may also contain some of all of the information contained in the intent transmitted in step 1106. Particularly, as shown in FIG. 10, this notification may include at least the command to take a picture. Possibly in response to receiving this notification, cell phone 1102 may take a picture, or may or place itself in a picture-taking mode so that a user can trigger a picture to be taken.

At step 1112, cell phone 1102 may transmit a result to sharing server 1004. The result may include a copy of the picture taken by cell phone 1102. Alternatively or additionally, the result may include a reference (e.g., a URL) to where the picture can be accessed on cell phone 1102 or some other device that has access to the picture.

At step 1114, sharing server 1004 may transmit another result to tablet computer 1100. Like the result transmitted in step 1112, this result may include a copy of the picture taken by cell phone 1102 and/or a reference (e.g., a URL) to where the picture can be accessed. Tablet computer 1100 may then use the picture in various ways, such as integrating the picture into an email, message, or document that is being drafted on tablet computer 1100. Additionally, after receiving the picture, tablet computer 1100 may either continue with the activity that it was performing prior to or during step 1106, or tablet computer 1100 may perform a different activity of the same task.

Figure 12:
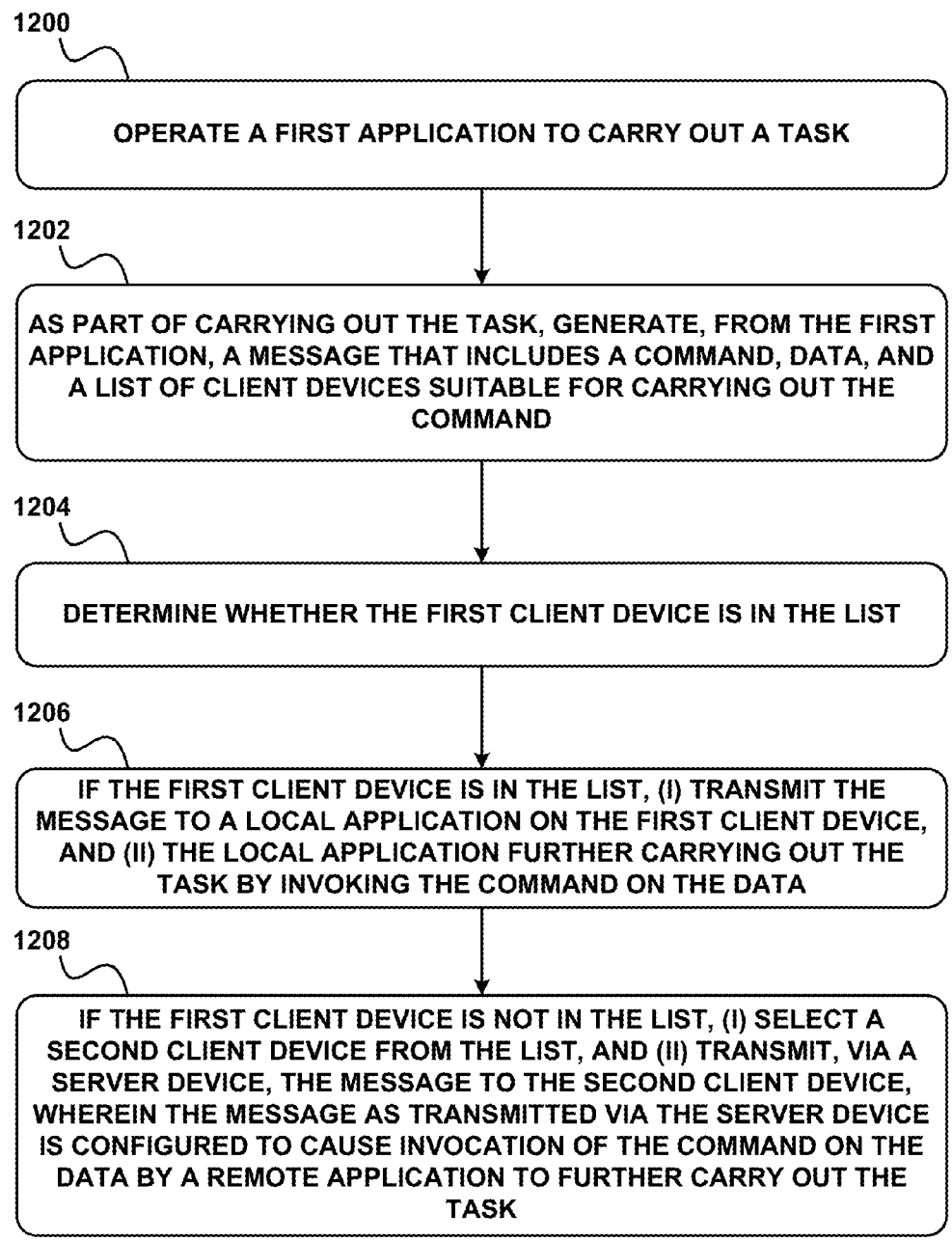
FIG. 12 is a flow chart, in accordance with an example embodiment.

FIG. 12 is a flow chart that illustrates an example method that could be performed on a client device to perform at least some of the client device functions depicted in FIGS. 10 and 11. At step 1200, a first application, operating on a first client device, may perform a task.

At step 1202, as part of performing the task, the first application may generate a message that includes a command, data, and a list of client devices suitable for invoking the command. Alternatively, the message may be generated by a separate service operating on the first client device, or by the operating system of the first client device. The command and/or the data may be capable of invoking the performance of an activity that is related to one or more activities being performed or previously performed by the first application.

In some embodiments, the data may be a reference to media accessible via a media server and the command may instruct the recipient to retrieve and play the referenced media. In other embodiments, the command may be related to providing media to the first client device, and the data may specify a type of media to provide. Alternatively, the data may be a callee phone number and the command may be related to placing a telephone call to the callee phone number. Still other embodiments are possible.

At step 1204, it may be determined whether the first client device is in the list. At step 1206, if the first client device is in the list, the first client device may (i) transmit the message to a local application on the first client device, and (ii) the local application may further perform the task by invoking the command on the data.

At step 1208, if the first client device is not in the list, the first client device may (i) select a second client device from the list, and (ii) transmit, via a server device, the message to the second client device. The message as transmitted via the server device may be configured to cause invocation of the command on the data, by a remote application, to further perform the task. Alternatively, even if the first client device is in the list (and thus suitable for invoking the command), the second client device may still be selected to invoke the command.

Transmitting the message to the local application may involve transmitting the message in a first message format, and transmitting the message to the remote application may involve transmitting the message in a second message format. The first message format and the second message format may be the same or different from one another.

Thus, for instance, the first message format may be in accordance with one or more of various types of inter-process communication technologies (e.g., sockets, remote procedure calls, message queues, pipes, etc.). Alternatively the message may be delivered by other inter-process communication technologies, such as shared memory, or files. The second message format may be in accordance with one or more of the various types of inter-device communication technologies (e.g., sockets, remote procedure calls, etc.).

On the other hand, transmitting the message to the local application may involve using the same message format as transmitting the message to the remote application. For example, this message format may make use of IP communication mechanisms (e.g., sockets or remote procedure calls), and may be formatted accordingly.

Selecting the second client device from the list may involve displaying, on a user interface of the first client device, a prompt requesting selection of a client device from the list. The user may select the second client device from the list. Alternatively, selecting the second client device from the list may involve determining that the second client device is a default client device for the command. For example, the first client device may be configured to always select the second client device for a given command. Or, the first client device may determine that the second client device has been previously selected from the list to invoke the command, and may select the second client device on this basis.

In some cases, the first client device may receive a result of the invocation of the command. Possibly in response to receiving the result of the invocation of the command, the first client device may provide the result to the first application, and/or incorporate at least part of the result into the first application.

Prior to at least some of the steps in FIG. 12, (e.g., before the first application operating on a first client device, or the first client device itself, generates a message) an association may be formed between the first client device and the second client device. The association may authorize the first client device to invoke commands on the second client device.

6. Client Device Software Architecture

Figure 13:
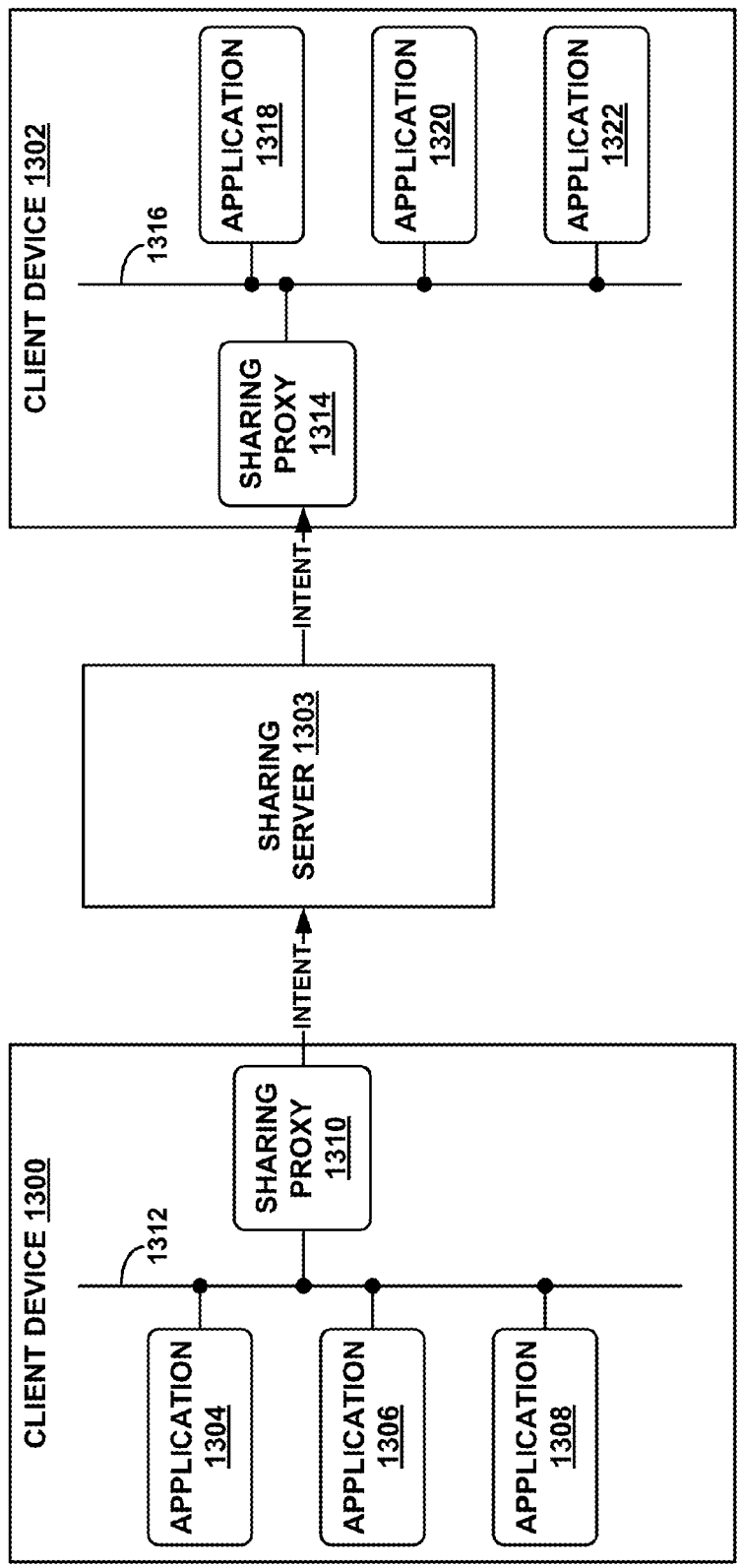
FIG. 13 depicts a client software architecture, in accordance with an example embodiment.

FIG. 13 depicts an example client software architecture that may facilitate one or more of the embodiments herein. In FIG. 13, a client device 1300 may be configured to be able to transmit an intent to a client device 1302 via a sharing server 1303. Client device 1300 may support the operation of one or more applications, such as applications 1304, 1306, and 1308. Similarly, client device 1302 may support the operation of one or more applications, such as applications 1318, 1320, and 1322.

The applications operating on client device 1300 may communicate with one another via a logical software bus 1312, which may utilize, for example, one or more of the various inter-process communication techniques described above. Similarly, the applications operating on client device 1302 may communicate with one another via a logical software bus 1316, which may also utilize one or more inter-process communication techniques.

Client device 1300 may support a sharing proxy 1310, and client device 1302 may support a sharing proxy 1314. These sharing proxies may be applications, or may be built into each respective client device's operating system. Sharing proxy 1310 may communicate with sharing server 1303 on behalf of applications 1304, 1306, and 1308. Likewise, sharing proxy 1314 may communicate with sharing server 1303 on behalf of applications 1318, 1320, and 1322.

The embodiments illustrated by FIGS. 5-8 may be facilitated by this software architecture. Particularly, an application operating on client device 1300, say application 1304, may be performing the activities of a task. One or more activities of this task may be distributed to an application operating on client device 1302, say application 1320. (Alternatively, the activity or activities distributed to client device 1302 may ultimately be carried out by an application that is not operating on client device 1302 at the time of the distribution.)

Therefore, application 1304 may use inter-process communication to transmit, to sharing proxy 1310, an intent to conduct an activity on client device 1302. Possibly in response to receiving the intent from application 1304, sharing proxy 1310 may transmit, via inter-device communication, the intent to sharing server 1303. Sharing server 1303 may then transmit the intent to sharing proxy 1314. Possibly in response to receiving the intent from sharing server 1303, sharing proxy 1314 may use inter-process communication to transmit the intent to application 1320.

It should be understood that this example is just one way in which the client software architecture of FIG. 13 can be used. Other ways of using this architecture, including embodiments that involve communication from client device 1302 to client device 1300, are also possible.

7. Conclusion

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium such as a storage device including a disk or hard drive or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
    operating, by a first client device, a first application to perform a task;
    as part of performing the task, generating, at the first application, a first message that includes a first command, first data, and a first list of one or more client devices suitable for invoking the first command;

determining, by the first client device, that the first client device is not in the first list;

in response to determining that the first client device is not in the first list, selecting, by the first client device, a second client device from the first list, and transmitting, by the first client device, the first message to the second client device via a server device, wherein the first message is configured to cause a second application on the second client device to invoke the first command on the first data, wherein the second application is different from the first application;

as part of performing the task, generating, at the first application, a second message that includes a second command, second data, and a second list of one or more client devices suitable for invoking the second command;

determining, by the first client device, that the first client device is in the second list; and in response to determining that the first client device is in the second list, providing, by the first client device, the second message to a third application on the first client device, wherein the second message is configured to cause the third application to invoke the second command on the second data, wherein the third application is different from the first application.

2. The method of claim 1, wherein selecting the second client device from the first list comprises displaying, on a user interface of the first client device, a prompt requesting selection of a client device from the first list.

3. The method of claim 1, wherein selecting the second client device from the first list comprises determining that the second client device is a default client device for the first command.

4. The method of claim 3, wherein determining that the second client device is the default client device for the first command comprises determining that the second client device has been previously selected to invoke the first command.

5. The method of claim 1, wherein the first data is a reference to media accessible via a media server device, and the first command is configured to cause the second client device to retrieve the referenced media from the media server device and to play out the referenced media.

6. The method of claim 1, wherein the second command is related to providing media to the first client device, and the second data specifies a type of media to provide.

7. The method of claim 1, wherein the second data is a callee phone number and the second command is related to placing a telephone call to the callee phone number.

8. The method of claim 1, further comprising:

receiving, by the first client device, a result of the invocation of the first command by the second client device;

in response to receiving the result of the invocation of the first command, providing, by the first client device, the result to the first application; and using, by the first application, at least part of the result.

9. The method of claim 1, further comprising:

before generating the first message, forming, by the first client device, an association with the second client device, wherein the association authorizes the first client device to invoke commands on the second client device.

10. The method of claim 1, wherein the first client device receives the first list of client devices suitable for invoking the command from the server device.

11. An article of manufacture including a non-transitory computer-readable medium, having stored thereon program instructions that, upon execution by a first client device, cause the first client device to perform operations comprising:

operating a first application;

generating, at the first application, a first message that includes a first command, first data, and a first list of one or more client devices suitable for invoking the first command;

determining that the first client device is not in the first list;

in response to determining that the first client device is not in the first list, selecting a second client device from the first list, and transmitting the first message to the second client device via a server device, wherein the first message is configured to cause a second application on the second client device to invoke the first command on the first data, wherein the second application is different from the first application;

generating, at the first application, a second message that includes a second command, second data, and a second list of one or more client devices suitable for invoking the second command;

determining that the first client device is in the second list; and in response to determining that the first client device is in the second list, providing the second message to a third application on the first client device, wherein the second message is configured to cause the third application to invoke the second command on the second data, wherein the third application is different from the first application.

12. The article of manufacture of claim 11, wherein selecting the second client device from the first list comprises displaying, on a user interface of the first client device, a prompt requesting selection of a client device from the first list.

13. The article of manufacture of claim 11, wherein selecting the second client device from the first list comprises determining that the second client device is a default client device for the first command.

14. The article of manufacture of claim 13, wherein determining that the second client device is the default client device for the first command comprises determining that the second client device has been previously selected to invoke the first command.

15. The article of manufacture of claim 11, wherein the first data is a reference to media accessible via a media server device and the first command is configured to cause the second client device to retrieve the referenced media from the media server device and to play out the referenced media.

16. The article of manufacture of claim 11, wherein the second command is related to providing media to the first client device, and the second data specifies a type of media to provide.

17. The article of manufacture of claim 11, wherein the second data is a callee phone number and the second command is related to placing a telephone call to the callee phone number.

18. The article of manufacture of claim 11, wherein the operations further comprise:

receiving a result of the invocation of the first command on the second client device;

in response to receiving the result of the invocation of the first command, providing the result to the first application; and using, by the first application, at least part of the result.

19. A first client device comprising:

a processor;

a communication interface; and data storage containing program instructions that, upon execution by the processor, cause the first client device to:

operate a first application;

generate, at the first application, a first message that includes a first command, first data, and a first list of client devices suitable for invoking the first command;

determine that the first client device is not in the first list;

in response to determining that the first client device is not in the first list, select a second client device from the first list, and transmit the first message to the second client device via a server device, wherein the first message is configured to cause a second application on the second client device to invoke the first command on the first data, wherein the second application is different from the first application;

generating, at the first application, a second message that includes a second command, second data, and a second list of one or more client devices suitable for invoking the second command;

determining that the first client device is in the second list; and in response to determining that the first client device is in the second list, providing the second message to a third application on the first client device, wherein the second message is configured to cause the third application to invoke the second command on the second data, wherein the third application is different from the first application.

* * * * *